US009942910B2

(12) United States Patent
Zhang et al.

(10) Patent No.: US 9,942,910 B2
(45) Date of Patent: Apr. 10, 2018

(54) METHOD FOR TRANSMITTING DATA ON WIRELESS LOCAL AREA NETWORK, USER EQUIPMENT, AND ACCESS POINT

(71) Applicant: Huawei Technologies Co., Ltd., Shenzhen, Guangdong (CN)

(72) Inventors: Hongping Zhang, Shanghai (CN); Qinghai Zeng, Shanghai (CN); Wenji Liu, Shanghai (CN); Qufang Huang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 177 days.

(21) Appl. No.: 14/974,946

(22) Filed: Dec. 18, 2015

(65) Prior Publication Data

US 2016/0105900 A1 Apr. 14, 2016

Related U.S. Application Data

(63) Continuation of application No. PCT/CN2013/077664, filed on Jun. 21, 2013.

(51) Int. Cl.
*H04W 72/08* (2009.01)
*H04W 74/08* (2009.01)
(Continued)

(52) U.S. Cl.
CPC ......... *H04W 72/085* (2013.01); *H04L 5/0055* (2013.01); *H04W 40/244* (2013.01);
(Continued)

(58) Field of Classification Search
CPC ............. H04W 72/085; H04W 40/244; H04W 72/0446; H04W 74/0816; H04W 84/12; H04L 5/0055
See application file for complete search history.

(56) References Cited

U.S. PATENT DOCUMENTS

2003/0181204 A1 9/2003 Benveniste
2006/0221924 A1 10/2006 Yang et al.
(Continued)

FOREIGN PATENT DOCUMENTS

CN 101137196 A 3/2008
CN 101741707 A 6/2010
(Continued)

OTHER PUBLICATIONS

Stefan Mangold et al., "IEEE 802.11e Wireless LAN for Quality of Service", Jan. 1, 2002, 8 pages.

*Primary Examiner* — Christine Ng

(57) ABSTRACT

The present invention discloses a method for transmitting data on a wireless local area network (WLAN), user equipment (UE), and an access point (AP). The method includes: receiving first indication information sent by an AP, where the first indication information is used to indicate that UE can preferentially send data to the AP when the UE obtains a transmission resource through contention; determining, according to the first indication information, a first moment for sending current data to the AP, where an interval between a second moment at which the UE receives a first feedback message sent by the AP and the first moment is a first sending interval, the first feedback message is used to indicate whether a previous piece of data is successfully received, and the first sending interval is less than a distributed interframe space (DIFS); and sending the current data to the AP at the first moment.

16 Claims, 5 Drawing Sheets

```
┌─────────────────────────────────────────────────────────┐
│ Receive first indication information sent by an access point AP, where │ 110
│ the first indication information is used to indicate that user equipment │
│ UE can preferentially send data to the AP when the UE obtains a │
│ transmission resource through contention │
└─────────────────────────────────────────────────────────┘
                              │
                              ▼
┌─────────────────────────────────────────────────────────┐
│ Determine, according to the first indication information, a first │
│ moment for sending current data to the AP, where an interval between │ 120
│ a second moment in which the UE receives a first feedback message │
│ sent by the AP and the first moment is a first sending interval, the first │
│ feedback message is used to indicate whether the AP has successfully │
│ received a previous piece of data sent by the UE, and the first sending │
│ interval is less than a distributed interframe space DIFS │
└─────────────────────────────────────────────────────────┘
                              │
                              ▼                          130
        ┌──────────────────────────────────────────────┐
        │ Send the current data to the AP at the first moment │
        └──────────────────────────────────────────────┘
```

(51) Int. Cl.
    *H04L 5/00*         (2006.01)
    *H04W 40/24*      (2009.01)
    *H04W 72/04*      (2009.01)
    *H04W 84/12*      (2009.01)

(52) U.S. Cl.
    CPC ... *H04W 72/0446* (2013.01); *H04W 74/0816* (2013.01); *H04W 84/12* (2013.01)

(56) References Cited

U.S. PATENT DOCUMENTS

| | | | |
|---|---|---|---|
| 2007/0097867 A1* | 5/2007 | Kneckt | H04W 72/1278 370/236 |
| 2008/0123606 A1* | 5/2008 | Takizawa | H04W 74/0875 370/338 |
| 2014/0078940 A1* | 3/2014 | Aggarwal | H04L 1/1854 370/278 |
| 2014/0349745 A1* | 11/2014 | Russo | A63F 13/12 463/29 |
| 2015/0156722 A1* | 6/2015 | Kim | H04W 74/08 370/311 |

FOREIGN PATENT DOCUMENTS

| | | | |
|---|---|---|---|
| CN | 101902822 A | | 12/2010 |
| EP | 1 764 961 A1 | | 3/2007 |
| EP | 1 903 829 A2 | | 3/2008 |

\* cited by examiner

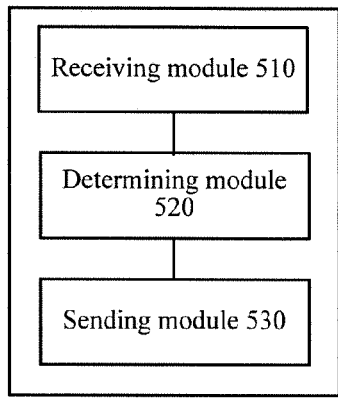
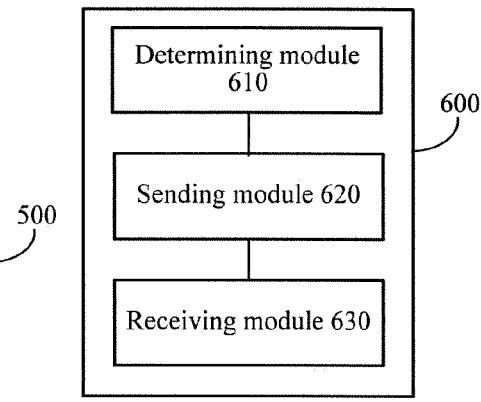
FIG. 7    FIG. 8
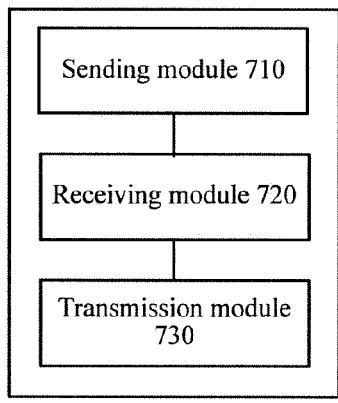
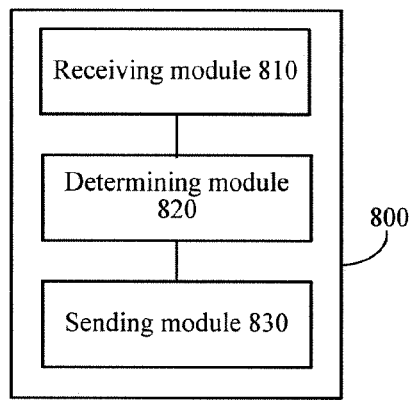
FIG. 9    FIG. 10
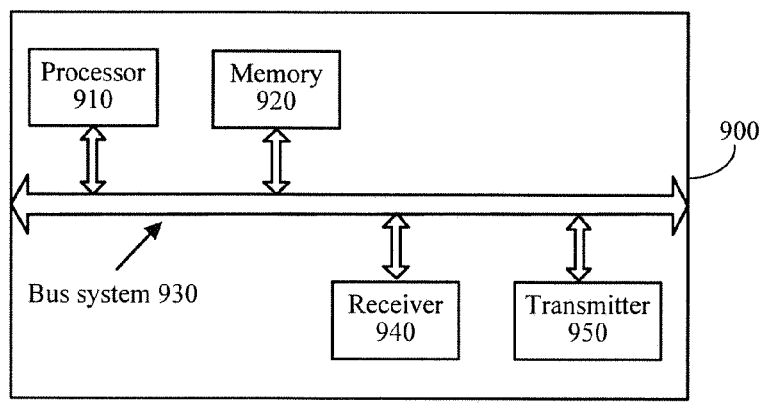
FIG. 11

METHOD FOR TRANSMITTING DATA ON WIRELESS LOCAL AREA NETWORK, USER EQUIPMENT, AND ACCESS POINT

CROSS-REFERENCE TO RELATED APPLICATIONS

This application is a continuation of International Application No. PCT/CN2013/077664, filed on Jun. 21, 2013, which is hereby incorporated by reference in its entirety.

TECHNICAL FIELD

Embodiments of the present invention relate to the field of communications, and more specifically, to a method for transmitting data on a wireless local area network, user equipment, and an access point.

BACKGROUND

In recent years, wireless local area networks (Wireless Local Area Network, WLAN for short) develop rapidly. On a WLAN, such as a wireless fidelity (Wireless Fidelity, WiFi for short) network, a distributed coordinated function (Distributed Coordinated Function, DCF for short) mechanism is used for sending uplink data. In the DCF mechanism, each time user equipment (User Equipment, UE for short) has to-be-transmitted uplink data, the user equipment needs to contend for a transmission resource. A specific data transmission process is as follows: the UE detects a transmission channel; if the transmission channel is busy, the UE continuously performs detection, until the UE detects that the transmission channel is idle and an idle time is greater than a distributed interframe space (Distributed interframe space, DIFS for short), and then the UE enters a contention window; in the contention window, the UE sets a random time that is within a specific range, and if the channel is always in an idle state before the random time expires, after the random time expires, it indicates that the UE successfully obtains the resource through contention, and the UE may begin to send data to an access point (Access Point, AP for short). After completing receiving of the data sent by the UE, the AP sends an acknowledgement (Acknowledgement, ACK for short) message or a negative acknowledgement (NACK) message to the UE after a time segment of a short interframe space (Short Interframe Space, SIFS for short), thereby completing a data packet sending process. If the UE still has data packet that needs to be sent subsequently, the UE needs to repeat the channel detection process until the UE obtains a transmission resource again through contention, and sends the data packet to the AP by using the transmission resource.

However, in the foregoing procedure, a case in which random times generated by multiple UEs are the same may occur, and in this case, the multiple UEs simultaneously send uplink data to an AP, and therefore, collision occurs. In this case, the multiple UEs interfere with each other, resulting in transmission failure of the data of all the multiple UEs. More UEs that one AP serves indicate a higher probability that collision occurs. The inventor discovers that, when a base service set (Base Service Set, BSS for short) of an AP includes 40 UEs, a probability that collision occurs reaches 20%. In addition, because multiple UEs still need to contend for a transmission resource for data retransmission after collision occurs, during the data retransmission of the multiple UEs, collision may occur again. As a result, a data transmission time delay is increased, transmission efficiency of a network is reduced, and user experience is poor.

SUMMARY

Embodiments of the present invention provide a method for transmitting data on a WLAN, user equipment UE, and an access point AP, which can reduce a probability that collision and interference occur when UE served by an AP sends data to the AP, thereby reducing a data transmission time delay.

According to a first aspect, an embodiment of the present invention provides a method for transmitting data on a WLAN, including: receiving first indication information sent by an access point AP, where the first indication information is used to indicate that user equipment UE can preferentially send data to the AP when the UE obtains a transmission resource through contention; determining, according to the first indication information, a first moment for sending current data to the AP, where an interval between a second moment at which the UE receives a first feedback message sent by the AP and the first moment is a first sending interval, the first feedback message is used to indicate whether the AP has successfully received a previous piece of data sent by the UE, and the first sending interval is less than a distributed interframe space DIFS; and sending the current data to the AP at the first moment.

With reference to the first aspect, in a first possible implementation manner, the receiving first indication information sent by an AP includes: receiving the first feedback message sent by the AP, where the first feedback message carries the first indication information, and the first indication information is specifically used to indicate that the UE can preferentially send the current data to the AP.

With reference to the first aspect, in a second possible implementation manner, the first indication information is specifically used to indicate that the UE can preferentially send data of a total data amount less than a preset threshold to the AP when the UE obtains a transmission resource through contention; and the determining, according to the first indication information, a first moment for sending current data to the AP includes: when a total data amount of data sent to the AP by using a first transmission resource obtained through contention does not exceed the preset threshold, determining the first moment for sending the current data to the AP.

With reference to the second possible implementation manner of the first aspect, in a third possible implementation manner, the receiving first indication information sent by an AP includes: receiving a beacon frame sent by the AP, where the beacon frame carries the first indication information; or receiving an association response message that is sent by the AP when the AP receives an association request message sent by the UE, where the association response message carries the first indication information; or receiving a clear to send CTS message that is sent by the AP when the AP receives a request to send RTS message sent by the UE, where the CTS message carries the first indication information.

With reference to the first aspect or with reference to any possible implementation manner of the first to the third possible implementation manners of the first aspect, in a fourth possible implementation manner, before the receiving first indication information sent by an AP, the method further includes: sending state information of the UE to the AP, so that the AP determines the first indication information according to the state information of the UE, where the state information of the UE includes at least one type of the following information: buffer status information of the UE and quality of service QoS information of the UE.

According to a second aspect, a method for transmitting data on a wireless local area network is provided, including: determining first indication information, where the first indication information is used to indicate that user equipment UE can preferentially send data to the AP when the UE obtains a transmission resource through contention; sending the first indication information to the UE, so that the UE determines, according to the first indication information, a first moment for sending current data, where an interval between a second moment at which the AP sends a first feedback message for indicating whether a previous piece of data is successfully received and the first moment is a first sending interval, and the first sending interval is less than a distributed interframe space DIFS; and receiving the current data that is sent at the first moment by the UE.

With reference to the second aspect, in a first possible implementation manner, before the determining first indication information, the method further includes: receiving state information of the UE sent by the UE or a serving base station of the UE, where the state information of the UE includes at least one type of the following information: buffer status information of the UE and quality of service QoS information of the UE; and the determining first indication information includes: determining the first indication information according to the state information of the UE.

With reference to the second aspect or with reference to the first possible implementation manner of the second aspect, in a second possible implementation manner, the sending the first indication information to the UE includes: sending the first indication information carried in the first feedback message, where the first indication information is used to indicate that the UE can preferentially send the current data to the AP.

With reference to the second aspect or with reference to the first possible implementation manner of the second aspect, in a third possible implementation manner, the first indication information is specifically used to indicate that the UE can preferentially send data of a total data amount less than a preset threshold to the AP when the UE obtains a transmission resource through contention; and the receiving the current data that is sent at the first moment by the UE includes: receiving the current data that is sent by the UE at the first moment when a total data amount of data sent by using a first transmission resource obtained through contention does not exceed the preset threshold.

With reference to the third possible implementation manner of the second aspect, in a fourth possible implementation manner, the sending the first indication information to the UE includes: sending a beacon frame to the UE, where the beacon frame carries the first indication information; or when receiving an association request message sent by the UE, sending an association response message to the UE, where the association response message carries the first indication information; or when receiving a request to send RTS message sent by the UE, sending a clear to send CTS message to the UE, where the CTS message carries the first indication information.

According to a third aspect, a method for transmitting data on a wireless local area network is provided, including: sending state information of user equipment UE to an access point AP, where the state information of the UE includes at least one type of the following information: buffer status information of the UE and quality of service QoS information of the UE, so that the AP determines a data transmission policy of the UE according to the state information of the UE; receiving first indication information sent by the AP, where the first indication information is used to indicate the data transmission policy; and performing data transmission with the AP according to the data transmission policy.

According to a fourth aspect, a method for transmitting data on a wireless local area network is provided, including: receiving state information of user equipment UE sent by the UE or a serving base station of the UE, where the state information of the UE includes at least one type of the following information: buffer status information of the UE and quality of service QoS information of the UE; determining a data transmission policy of the UE according to the state information of the UE; and sending first indication information to the UE, where the first indication information is used to indicate the data transmission policy.

According to a fifth aspect, user equipment UE is provided, including: a receiving module, configured to receive first indication information sent by an access point AP, where the first indication information is used to indicate that the UE can preferentially send data to the AP when the UE obtains a transmission resource through contention; a determining module, configured to determine, according to the first indication information received by the receiving module, a first moment for sending current data to the AP, where an interval between a second moment at which the UE receives a first feedback message sent by the AP and the first moment is a first sending interval, the first feedback message is used to indicate whether the AP has successfully received a previous piece of data sent by the UE, and the first sending interval is less than a distributed interframe space DIFS; and a sending module, configured to send the current data to the AP at the first moment determined by the determining module.

With reference to the fifth aspect, in a first possible implementation manner, the receiving module is specifically configured to receive the first feedback message sent by the AP, where the first feedback message carries the first indication information, and the first indication information is specifically used to indicate that the UE can preferentially send the current data to the AP.

With reference to the fifth aspect, in a second possible implementation manner, the first indication information received by the receiving module is specifically used to indicate that the UE can preferentially send data of a total data amount less than a preset threshold to the AP when the UE obtains a transmission resource through contention; and the determining module is specifically configured to: when a total data amount of data sent to the AP by using a first transmission resource obtained through contention does not exceed the preset threshold, determine the first moment for sending the current data to the AP.

With reference to the second possible implementation manner of the fifth aspect, in a third possible implementation manner, the receiving module is specifically configured to receive a beacon frame sent by the AP, where the beacon frame carries the first indication information; or the receiving module is specifically configured to receive an association response message that is sent by the AP when the AP receives an association request message sent by the UE, where the association response message carries the first indication information; or the receiving module is specifically configured to receive a clear to send CTS message that is sent by the AP when the AP receives a request to send RTS message sent by the UE, where the CTS message carries the first indication information.

With reference to the fifth aspect or with reference to any possible implementation manner of the first to the third possible implementation manners of the fifth aspect, in a fourth possible implementation manner, the sending module is further configured to: before the receiving module receives the first indication information sent by the AP, send state information of the UE to the AP, so that the AP determines the first indication information according to the state information of the UE, where the state information of the UE includes at least one type of the following information: buffer status information of the UE and quality of service QoS information of the UE.

According to a sixth aspect, an access point AP is provided, including: a determining module, configured to determine first indication information, where the first indication information is used to indicate that user equipment UE can preferentially send data to the AP when the UE obtains a transmission resource through contention; a sending module, configured to send the first indication information determined by the determining module to the UE, so that the UE determines, according to the first indication information, a first moment for sending current data, where an interval between a second moment at which the AP sends a first feedback message for indicating whether a previous piece of data is successfully received and the first moment is a first sending interval, and the first sending interval is less than a distributed interframe space DIFS; and a receiving module, configured to receive the current data that is sent by the UE at the first moment determined according to the first indication information sent by the sending module.

With reference to the sixth aspect, in a first possible implementation manner, the receiving module is further configured to: before the determining module determines the first indication information, receive state information of the UE sent by the UE or a serving base station of the UE, where the state information of the UE includes at least one type of the following information: buffer status information of the UE and quality of service QoS information of the UE; and the determining module is specifically configured to determine the first indication information according to the state information of the UE received by the receiving module.

With reference to the sixth aspect or with reference to the first possible implementation manner of the sixth aspect, in a second possible implementation manner, the sending module is specifically configured to send the first indication information carried in the first feedback message, where the first indication information is used to indicate that the UE can preferentially send the current data to the AP.

With reference to the sixth aspect or with reference to the first possible implementation manner of the sixth aspect, in a third possible implementation manner, the first indication information determined by the determining module is specifically used to indicate that the UE can preferentially send data of a total data amount less than a preset threshold to the AP when the UE obtains a transmission resource through contention; and the receiving module is specifically configured to receive the current data that is sent by the UE at the first moment when a total data amount of data sent by using a first transmission resource obtained through contention does not exceed the preset threshold.

With reference to the third possible implementation manner of the sixth aspect, in a fourth possible implementation manner, the sending module is specifically configured to send a beacon frame to the UE, where the beacon frame carries the first indication information; or the sending module is specifically configured to: when an association request message sent by the UE is received, send an association response message to the UE, where the association response message carries the first indication information; or the sending module is specifically configured to: when a request to send RTS message sent by the UE is received, send a clear to send CTS message to the UE, where the CTS message carries the first indication information.

According to a seventh aspect, user equipment UE is provided, including: a sending module, configured to send state information of the UE to an access point AP, where the state information of the UE includes at least one type of the following information: buffer status information of the UE and quality of service QoS information of the UE, so that the AP determines a data transmission policy of the UE according to the state information of the UE; a receiving module, configured to receive first indication information sent by the AP, where the first indication information is used to indicate the data transmission policy that is determined by the AP according to the state information sent by the sending module; and a transmission module, configured to perform data transmission with the AP according to the data transmission policy received by the receiving module.

According to an eighth aspect, an access point AP is provided, including: a receiving module, configured to receive state information of user equipment UE sent by the UE or a serving base station of the UE, where the state information of the UE includes at least one type of the following information: buffer status information of the UE and quality of service QoS information of the UE; a determining module, configured to determine a data transmission policy of the UE according to the state information of the UE received by the receiving module; and a sending module, configured to send first indication information to the UE, where the first indication information is used to indicate the data transmission policy determined by the determining module.

Based on the foregoing technical solutions, according to the method for transmitting data on a WLAN, the UE, and the AP in the embodiments of the present invention, the UE is configured, by using the AP, to preferentially send data to the AP when the UE obtains a transmission resource through contention, so that when the UE has sent a previous piece of data to the AP and needs to send current data, the UE does not need to contend for a resource again, and after receiving a feedback message that is sent by the AP and that is used to indicate whether the previous piece of data is successfully received, can send the current data to the AP within a time interval less than a DIFS, while another UE can begin contending for a resource only when detecting that a transmission channel is always idle within a time interval in the DIFS; in this way, collision between the UE and the another UE can be avoided, and a probability that collision and interference occur when UEs served by the AP send data to the AP can be reduced, thereby reducing a data transmission time delay, increasing data transmission efficiency, and improving user experience.

BRIEF DESCRIPTION OF THE DRAWINGS

To describe the technical solutions in the embodiments of the present invention more clearly, the following briefly introduces the accompanying drawings required for describing the embodiments of the present invention or the prior art. Apparently, the accompanying drawings in the following description show merely some embodiments of the present invention, and a person of ordinary skill in the art may still derive other drawings from these accompanying drawings without creative efforts.

FIG. 7 is a schematic block diagram of user equipment UE according to an embodiment of the present invention;

FIG. 8 is a schematic block diagram of an access point AP according to an embodiment of the present invention;

FIG. 9 is a schematic block diagram of user equipment UE according to another embodiment of the present invention;

FIG. 10 is a schematic block diagram of an access point AP according to another embodiment of the present invention;

FIG. 11 is a schematic block diagram of user equipment UE according to still another embodiment of the present invention;

DETAILED DESCRIPTION

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention uses a WLAN communications system that adopts the WIFI technology as an example, but the technical solutions of the embodiments of the present invention may be applied to various communications systems, such as: a Global System of Mobile Communications (Global System of Mobile communication, "GSM" for short) system, a Code Division Multiple Access (Code Division Multiple Access, "CDMA" for short) system, a Wideband Code Division Multiple Access (Wideband Code Division Multiple Access, "WCDMA" for short) system, a general packet radio service (General Packet Radio Service, "GPRS" for short), a Long Term Evolution (Long Term Evolution, "LTE" for short) system, an LTE frequency division duplex (Frequency Division Duplex, "FDD" for short) system, an LTE time division duplex (Time Division Duplex, "TDD" for short), a Universal Mobile Telecommunications System (Universal Mobile Telecommunication System, "UMTS" for short), a Worldwide Interoperability for Microwave Access (Worldwide Interoperability for Microwave Access, "WiMAX" for short) communications system, or the like.

It should also be understood that in the embodiments of the present invention, user equipment (User Equipment, UE for short) may be a site, a terminal (Terminal), a mobile station (Mobile Station, MS for short), a mobile terminal (Mobile Terminal), and the like that supports a WIFI communications protocol. The user equipment may communicate with one or more core networks through a radio access network (Radio Access Network, RAN for short). For example, the site may be a mobile phone (also referred to as a "cellular" phone) or a computer with a mobile terminal. For example, the site may also be a portable, pocket-sized, handheld, computer built-in, or in-vehicle mobile apparatus, which exchanges voice and/or data with the radio access network.

It should be further understood that, in the embodiments of the present invention, an AP may provide an access service to the UE, and the AP may be an access point in WiFi, or may be a base station (Base Transceiver Station, BTS for short) in GSM or CDMA, or may be a base station (NodeB) in WCDMA, or may be an evolved NodeB (evolved Node B, eNB or e-NodeB for short) in LTE. The present invention sets no limitation thereto.

Figure 1:
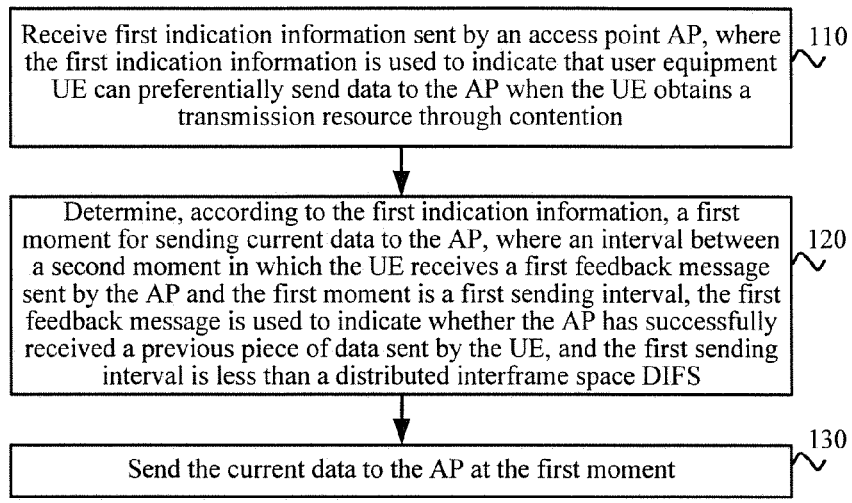
FIG. 1 is a schematic flowchart of a method for transmitting data on a WLAN according to an embodiment of the present invention.

FIG. 1 shows a schematic flowchart of a method 100 for transmitting data on a wireless local area network WLAN according to an embodiment of the present invention. The method may be executed by user equipment UE. As shown in FIG. 1, the method 100 includes:

S110: Receive first indication information sent by an access point AP, where the first indication information is used to indicate that the user equipment UE can preferentially send data to the AP when the UE obtains a transmission resource through contention.

S120: Determine, according to the first indication information, a first moment for sending current data to the AP, where an interval between a second moment at which the UE receives a first feedback message sent by the AP and the first moment is a first sending interval, the first feedback message is used to indicate whether the AP has successfully received a previous piece of data sent by the UE, and the first sending interval is less than a distributed interframe space DIFS.

S130: Send the current data to the AP at the first moment.

Therefore, according to the method for transmitting data on a WLAN in this embodiment of the present invention, UE is configured, by using an AP, to preferentially send data to the AP when the UE obtains a transmission resource through contention, so that when the UE has sent a previous piece of data to the AP after obtaining a transmission resource through contention and needs to send current data, the UE does not need to contend for a resource again, and after receiving a feedback message that is sent by the AP and that is used to indicate whether the previous piece of data is successfully received, can send the current data to the AP within a time interval less than a DIFS, while another UE can begin contending for a resource only when detecting that a transmission channel is always idle within a time interval in the DIFS; in this way, collision between the UE and the another UE can be avoided, and a probability that collision and interference occur when UEs served by the AP send data to the AP can be reduced, thereby reducing a data transmission time delay, increasing data transmission efficiency, and improving user experience.

In this embodiment of the present invention, the second moment is earlier than the first moment, and the first sending interval between the second moment and the first moment is less than the DIFS. Specifically, the first sending interval may be greater than an SIFS and less than the DIFS, or the first sending interval is equal to an SIFS. However, UE that has not received the first indication information still needs to detect, within a time segment whose start point is the first moment and whose length is the DIFS, whether the transmission channel of the AP is always in an idle state, and when the transmission channel of the AP is always in an idle state until the DIFS expires, sets a random time segment to contend for a transmission resource with another UE that has not received the first indication information. Therefore, the UE that has received the first indication information can send data earlier than the UE that has not received the first indication information, thereby avoiding collision and interference caused by simultaneous sending of data. Optionally, the first sending interval may also be equal to the DIFS. In this case, when sending data, the UE that has not received the first indication information needs to send the data after the time interval of the DIFS and a random time segment; therefore, the UE that has received the first indication information can still send data earlier than another UE. However, the UE may collide with UE whose random time segment is set to 0 among other UEs, but a probability that a random time segment is 0 is relatively small. Therefore, the method can still reduce a probability that collision occurs when UEs served by the AP send data, thereby improving a data transmission rate. However, this embodiment of the present invention is not limited thereto.

In this embodiment of the present invention, the previous piece of data and the current data may be same data, for example, when the AP fails to successfully receive the previous piece of data, the UE may perform data retransmission. Optionally, the previous piece of data and the current data may be different data. This embodiment of the present invention is not limited thereto.

Optionally, the AP may determine, according to one or more of the following factors, whether the UE can preferentially send data to the AP: a current data buffer size of the UE, quality of service (Quality of Service, QoS for short) of the UE, and a current network state. However, this embodiment of the present invention is not limited thereto.

Optionally, each time the AP receives a data packet sent by the UE, the AP may determine whether the UE can preferentially send a next data packet, and indicate each time, in a feedback message (for example, an ACK/a NACK) that is sent to the UE and that is used to indicate whether the AP has successfully received the current data packet sent by the UE, whether the UE can preferentially send the next data packet. In this way, signaling overheads can be reduced, and the AP can flexibly perform a scheduling according to a current network state.

Optionally, S110, the receiving first indication information sent by an AP includes:

S111: Receive the first feedback message sent by the AP, where the first feedback message carries the first indication information, and the first indication information is specifically used to indicate that the UE can preferentially send the current data to the AP.

The first feedback message may be an ACK or a NACK. However, this embodiment of the present invention is not limited thereto. Optionally, the first indication information may one bit to indicate whether the UE can preferentially send the current data. For example, when the first indication information is set to 1, it indicates that the UE can preferentially send the current data, that is, the UE does not need to contend for a resource again for sending the data; when the first indication information is set to 0, it indicates that the UE cannot preferentially send the current data, that is, the UE needs to contend for a resource again for sending the data; or vice versa. However, this embodiment of the present invention is not limited thereto.

Optionally, as another embodiment, the UE may also begin timekeeping from the second moment, and detect, within a time segment of the first sending interval, whether the transmission channel of the AP is in an idle state. If the UE detects that the transmission channel of the AP is always in an idle state until the first sending interval expires, the UE sends the current data at the first moment; when the UE detects, before the first sending interval expires, that the transmission channel of the AP is busy, it indicates that the source is already occupied by the AP or another UE, the UE may give up sending the current data and begin timekeeping again. However, this embodiment of the present invention is not limited thereto.

Optionally, as another embodiment, when the AP determines that the UE cannot preferentially send the current data, the UE needs to contend for a resource with another UE when sending the current data, and can send the current data only when obtaining a resource through contention. Specifically, the UE determines whether the transmission channel of the AP is always in an idle state within a time segment whose start point is the second moment and whose length is the DIFS; when the transmission channel of the AP is always in an idle state within the time segment of the DIFS, the UE contends for a transmission resource within a random time segment; and when obtaining the transmission resource through contention, the UE sends the current data to the AP by using the transmission resource. However, this embodiment of the present invention is not limited thereto.

In the foregoing embodiment, the first indication information sent by the AP to the UE is used to indicate that the UE can preferentially send the current data. Therefore, each time the AP receives a data packet sent by the UE, the AP may indicate, in an ACK/NACK message for the data packet, whether the UE can preferentially send a next data packet. Accordingly, each time the UE receives the indication, the UE may determine which manner is to be used to send the next data packet. Optionally, as another embodiment, the first indication information may also indicate that once the UE obtains a resource through contention, the UE can preferentially send data of a total data amount within a preset threshold to the AP by using the resource obtained through contention. In this way, a quantity of times that the AP sends indication information to the UE is reduced, and accordingly, after obtaining a transmission resource through contention, the UE can successively send multiple data packets to the AP without needing to contend for a resource, until the UE does not have to-be-sent data or a total data amount of data sent by the UE reaches the preset threshold. However, this embodiment of the present invention is not limited thereto.

Optionally, the first indication information is specifically used to indicate that the UE can preferentially send data of a total data amount less than a preset threshold to the AP when the UE obtains a transmission resource through contention.

Accordingly, in S120, the determining, according to the first indication information, a first moment for sending current data to the AP includes:

S121: When a total data amount of data sent to the AP by using a first transmission resource obtained through contention does not exceed the preset threshold, determine the first moment for sending the current data to the AP.

Optionally, the total data amount of the sent data may indicate a total quantity of bits of the sent data, or may refer to a total quantity of sent data packets. The preset threshold may vary according to a transmission time delay requirement of a service, so that the UE can continuously send as much data as possible after obtaining a transmission resource through contention, and the UE is prevented from sending excessive data to cause data congestion of another UE and affect service experience of the another UE. However, this embodiment of the present invention is not limited thereto.

After obtaining the first transmission resource through contention, the UE may send a data packet to the AP, and after receiving a feedback message sent by the AP, send a next data packet within a time interval less than the DIFS, until the UE does not have to-be-sent data or a total amount of data that is successively sent by the UE exceeds the preset threshold. The UE may send each data packet by using a same sending interval, or may send each data packet by using a different sending interval. If the total data amount exceeds the preset threshold and the UE still have to-be-sent data, the UE needs to contend for a transmission resource for transmitting a next packet. However, this embodiment of the present invention is not limited thereto.

In this case, the AP may send the first indication information to the UE in multiple manners. Optionally, the AP may broadcast the first indication information to all UEs served by the AP, for example, add the first indication information to a beacon (Beacon) frame; or when the UE sends a request to send (Request to Send, RTS for short) message to the AP, to request the AP to allocate a transmission resource to the UE, the AP may send a clear to send (Clear to Send, CTS for short) message to the UE, and add the first indication information to the CTS message; or when the AP receives an association request message sent by the UE, the AP may add the first indication information to an association response message sent to the UE. This embodiment of the present invention does not limit a manner in which the AP sends the first indication information.

Accordingly, S110, the receive first indication information sent by an AP includes:

S112: Receive a beacon frame sent by the AP, where the beacon frame carries the first indication information; or S113: receive an association response message that is sent by the AP when the AP receives an association request message sent by the UE, where the association response message carries the first indication information; or S114: receive a clear to send CTS message that is sent by the AP when the AP receives a request to send RTS message sent by the UE, where the CTS message carries the first indication information.

Optionally, as another embodiment, before S110, the method 100 further includes:

S140: Send state information of the UE to the AP, so that the AP determines the first indication information according to the state information of the UE,
where the state information of the UE includes at least one type of the following information: buffer status information of the UE and quality of service QoS information of the UE.

The UE may directly send the state information of the UE to the AP, or may first send buffer status information of the UE, for example, a buffer status report (Buffer Status Report, BSR for short), to a base station, and the base station sends the buffer status information and/or the QoS information of the UE to the AP. However, this embodiment of the present invention is not limited thereto.

Therefore, according to the method for transmitting data on a WLAN in this embodiment of the present invention, UE is configured, by using an AP, to preferentially send data to the AP when the UE obtains a transmission resource through contention, so that when the UE has sent a previous piece of data to the AP and needs to send current data, the UE does not need to contend for a resource again, and after receiving a feedback message that is sent by the AP and that is used to indicate whether the previous piece of data is successfully received, can send the current data to the AP within a time interval less than a DIFS, while another UE can begin contending for a resource only when detecting that a transmission channel is always idle within a time interval in the DIFS; in this way, collision between the UE and the another UE can be avoided, and a probability that collision and interference occur when UEs served by the AP send data to the AP can be reduced, thereby reducing a data transmission time delay, increasing data transmission efficiency, and improving user experience.

In the foregoing, the method for transmitting data on a WLAN according to the embodiment of the present invention is described in detail from the perspective of UE with reference to FIG. 1. In the following, a method for transmitting data on a WLAN according to an embodiment of the present invention is described in detail from the perspective of a base station with reference to FIG. 2.

Figure 2:
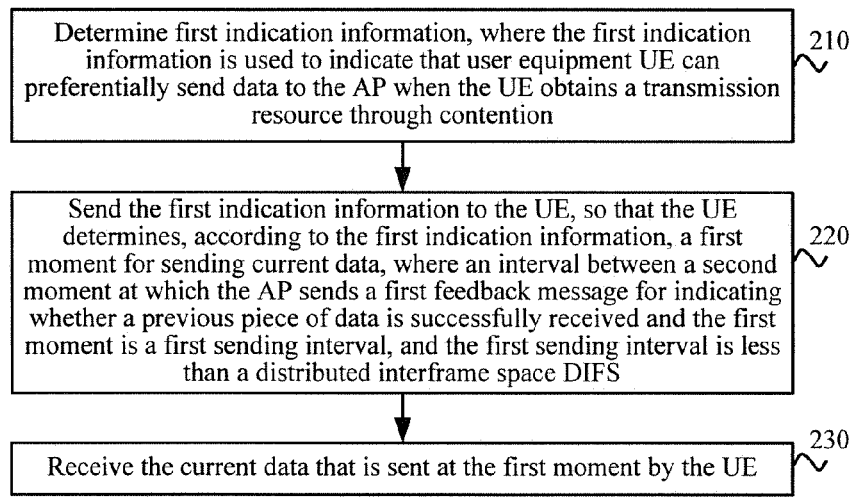
FIG. 2 is a schematic flowchart of a method for transmitting data on a WLAN according to another embodiment of the present invention.

FIG. 2 shows a schematic flowchart of a method 200 for transmitting data on a WLAN according to another embodiment of the present invention. The method may be executed by an access point AP. As shown in FIG. 2, the method 200 includes:

S210: Determine first indication information, where the first indication information is used to indicate that user equipment UE can preferentially send data to the AP when the UE obtains a transmission resource through contention.

S220: Send the first indication information to the UE, so that the UE determines, according to the first indication information, a first moment for sending current data, where an interval between a second moment at which the AP sends a first feedback message for indicating whether a previous piece of data is successfully received and the first moment is a first sending interval, and the first sending interval is less than a distributed interframe space DIFS.

S230: Receive the current data that is sent at the first moment by the UE.

Therefore, according to the method for transmitting data on a WLAN in this embodiment of the present invention, UE is configured, by using an AP, to preferentially send data to the AP when the UE obtains a transmission resource through contention, so that when the UE has sent a previous piece of data to the AP and needs to send current data, the UE does not need to contend for a resource again, and after receiving a feedback message that is sent by the AP and that is used to indicate whether the previous piece of data is successfully received, can send the current data to the AP within a time interval less than a DIFS, while another UE can begin contending for a resource only when detecting that a transmission channel is always idle within a time interval in the DIFS; in this way, collision between the UE and the another UE can be avoided, and a probability that collision and interference occur when UEs served by the AP send data to the AP can be reduced, thereby reducing a data transmission time delay, increasing data transmission efficiency, and improving user experience.

Optionally, the first indication information may indicate that the UE can preferentially send a next data packet to the AP, or indicate that the UE can successively send, when the UE obtains a transmission resource through contention, data of a total data amount less than a preset threshold to the AP, so that when the UE determines, according to the first indication information, that the UE can preferentially send data to the AP, and begins timekeeping at a moment at which feedback information that is sent by the AP and that is used to indicate whether a previous piece of data sent by the UE is successfully received is received, if a transmission channel of the AP is always in an idle state until the first sending interval less than the DIFS expires, the UE sends the current data to the AP. However, this embodiment of the present invention is not limited thereto.

Figure 5:
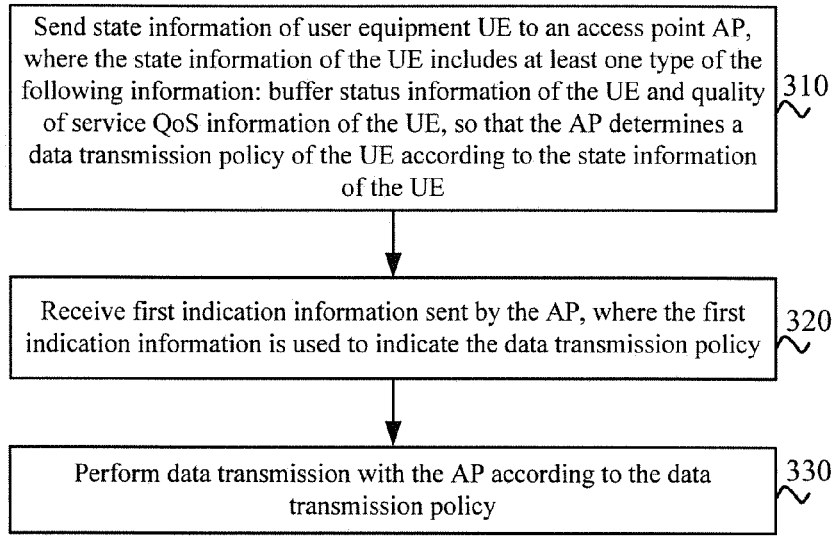
FIG. 5 is a schematic flowchart of a method for transmitting data on a WLAN according to still another embodiment of the present invention.

Optionally, the AP may determine, according to state information of the UE, whether the UE has a high priority to send data. As shown in FIG. 5, before S210, the method 200 further includes:

S240: Receive state information of the UE sent by the UE or a serving base station of the UE, where the state information of the UE includes at least one type of the following information: buffer status information of the UE and quality of service QoS information of the UE.

Accordingly, S210, the determining first indication information includes:

S211: Determine the first indication information according to the state information of the UE.

Optionally, the first indication information may only indicate whether the UE has a high priority to send data next time. S220, the sending the first indication information to the UE includes:

S221: Send the first indication information carried in the first feedback message, where the first indication information is used to indicate that the UE can preferentially send the current data to the AP.

Optionally, the first indication information may also be carried in another message and sent. This embodiment of the present invention is not limited thereto.

Optionally, when receiving the current data sent by the UE, the AP may still determine, according to the current buffer status information of the UE and/or the QoS information of the UE, whether the UE can preferentially send next piece of data. Optionally, when the AP determines that the UE can send next piece of data, the UE may send the next piece of data when a second sending interval expires. Accordingly, the AP receives, when the second sending interval expires, the next piece of data sent by the UE, where the second sending interval starts from a moment at which the UE receives a feedback message that is sent by the AP and that is used to indicate whether the current data is successfully received, and the second sending interval is less than the DIFS. Optionally, when the AP determines that the UE cannot preferentially send next piece of data, the UE may contend for a transmission resource, and send the next piece of data after obtaining a transmission resource through contention.

Optionally, the first indication information is specifically used to indicate that the UE can preferentially send data of a total data amount less than a preset threshold to the AP when the UE obtains a transmission resource through contention.

Accordingly, S230, the receiving the current data that is sent at the first moment by the UE includes:

S231: Receive the current data that is sent by the UE at the first moment when a total data amount of data sent by using a first transmission resource obtained through contention does not exceed the preset threshold.

Optionally, as another embodiment, S220, the sending the first indication information to the UE includes:

S222: Send a beacon frame to the UE, where the beacon frame carries the first indication information; or S223: when receiving an association request message sent by the UE, send an association response message to the UE, where the association response message carries the first indication information; or S224: when receiving a request to send RTS message sent by the UE, send a clear to send CTS message to the UE, where the CTS message carries the first indication information.

Therefore, according to the method for transmitting data on a WLAN in this embodiment of the present invention, UE is configured, by using an AP, to preferentially send data to the AP when the UE obtains a transmission resource through contention, so that when the UE has sent a previous piece of data to the AP and needs to send current data, the UE does not need to contend for a resource again, and after receiving a feedback message that is sent by the AP and that is used to indicate whether the previous piece of data is successfully received, can send the current data to the AP within a time interval less than a DIFS, while another UE can begin contending for a resource only when detecting that a transmission channel is always idle within a time interval in the DIFS; in this way, collision between the UE and the another UE can be avoided, and a probability that collision and interference occur when UEs served by the AP send data to the AP can be reduced, thereby reducing a data transmission time delay, increasing data transmission efficiency, and improving user experience.

Figure 3:
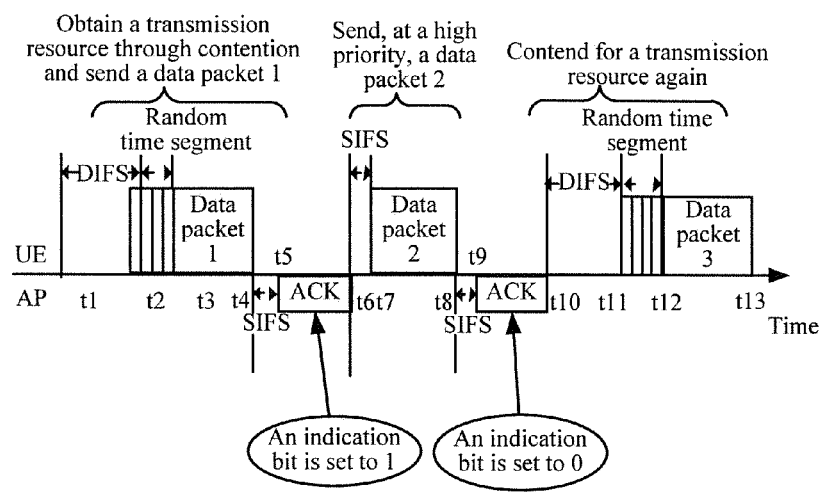
FIG. 3 is a schematic diagram of data transmission between UE and an AP according to an embodiment of the present invention.

With reference to specific examples and in a more detailed manner, the following describes the method for transmitting data on a WLAN provided in this embodiment of the present invention. FIG. 3 shows a schematic diagram of data transmission between UE and an AP according to an embodiment of the present invention. As shown in FIG. 3, a behavior of the UE is indicated above a time axis, and a behavior of the AP is indicated below the time axis. A process of data transmission between the UE and the AP is specifically as follows:

the UE detects that a transmission channel of the AP is always in an idle state within an interval of a DIFS from t1 to t2, and then the UE begins contending for a transmission resource, and sets a random time segment by using t2 as a start point; and if the transmission channel is always in an idle state until the random time segment expires, that is, within a random time segment from t2 to t3, the UE successfully obtains a transmission resource through contention, and then the UE sends a data packet 1 to the AP by using the transmission resource;

after successfully receiving the data packet 1, and after an interval of an SIFS, that is, at a t5 moment, the AP sends the UE an ACK message that is used to indicate that the data packet 1 is successfully received, where an indication bit, used to indicate whether the UE can preferentially send a next data packet, in the ACK message is set to 1, to indicate that the UE can preferentially send the next data packet; and after receiving the ACK message at a t6 moment, the UE determines that the UE does not need to contend for a transmission resource again, and therefore sends a data packet 2 to the AP after an interval of an SIFS, that is, at a t7 moment; and after completing receiving of the data packet 2, and after an interval of an SIFS, that is, at a t9 moment, the AP sends the UE an ACK message that is used to indicate that the data packet 2 is successfully received, where an indication bit, used to indicate whether the UE can preferentially send a next data packet, in the ACK message is set to 0; and at a t10 moment, the UE completes receiving of the ACK message, determines that the UE cannot preferentially send the next data packet, and therefore acquires, through contention, a transmission resource for sending a data packet 3.

Therefore, according to the method for transmitting data on a WLAN in this embodiment of the present invention, UE is configured, by using an AP, to preferentially send data to the AP when the UE obtains a transmission resource through contention, so that when the UE has sent a previous piece of data to the AP and needs to send current data, the UE does not need to contend for a resource again, and after receiving a feedback message that is sent by the AP and that is used to indicate whether the previous piece of data is successfully received, can send the current data to the AP within a time interval less than a DIFS, while another UE can begin contending for a resource only when detecting that a transmission channel is always idle within a time interval in the DIFS; in this way, collision between the UE and the another UE can be avoided, and a probability that collision and interference occur when UEs served by the AP send data to the AP can be reduced, thereby reducing a data transmission time delay, increasing data transmission efficiency, and improving user experience.

Figure 4:
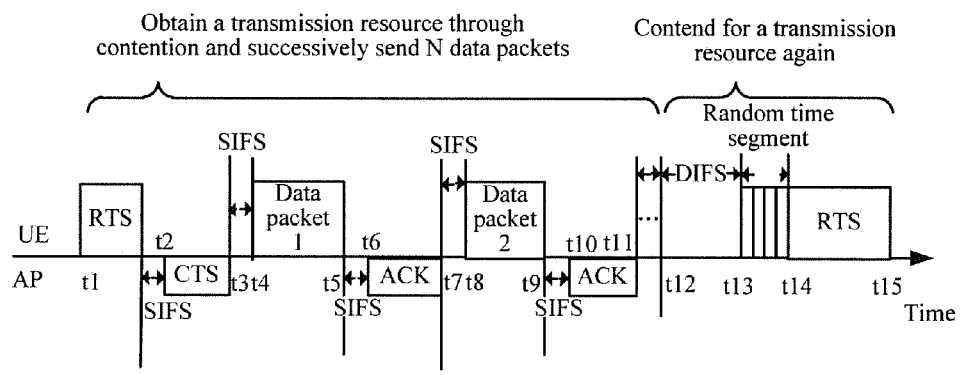
FIG. 4 is another schematic diagram of data transmission between UE and an AP according to an embodiment of the present invention.

FIG. 4 shows another schematic diagram of data transmission between UE and an AP according to an embodiment of the present invention. As shown in FIG. 4, a behavior of the UE is indicated above a time axis, and a behavior of the AP is indicated below the time axis. A process of data transmission between the UE and the AP is specifically as follows:

after obtaining a transmission resource through contention, the UE sends an RST message to the AP, to request the AP to allow the UE to send data; and after receiving the RST message at a t1 moment, and after an interval of an SIFS, that is, at a t2 moment, the AP sends the UE a CTS message to allow the UE to send the data, where the CTS is further used to indicate a total amount of data that can be successively sent by the UE;

at a t3 moment, the UE receives the CTS message, and then, after an interval of an SIFS, that is, at a t4 moment, the UE sends a data packet 1 to the AP; at a t5 moment, the AP completes receiving of the data packet 1, and then, after an interval of an SIFS, that is, at a t6 moment, sends the UE an ACK message that is used to indicate that the AP has successfully received the data packet 1; and after receiving the ACK message, and after an interval of an SIFS, the UE sends a data packet 2, and so on, until a total amount of data sent by the UE reaches a preset threshold indicated in the CTS message; and the UE contends for a transmission resource again, and sends an RTS message to the AP after obtaining a transmission resource through contention.

Therefore, according to the method for transmitting data on a WLAN in this embodiment of the present invention, UE is configured, by using an AP, to preferentially send data to the AP when the UE obtains a transmission resource through contention, so that when the UE has sent a previous piece of data to the AP and needs to send current data, the UE does not need to contend for a resource again, and after receiving a feedback message that is sent by the AP and that is used to indicate whether the previous piece of data is successfully received, can send the current data to the AP within a time interval less than a DIFS, while another UE can begin contending for a resource only when detecting that a transmission channel is always idle within a time interval in the DIFS; in this way, collision between the UE and the another UE can be avoided, and a probability that collision and interference occur when UEs served by the AP send data to the AP can be reduced, thereby reducing a data transmission time delay, increasing data transmission efficiency, and improving user experience.

It should be noticed that, the examples in FIG. 3 and FIG. 4 are intended to help a person skilled in the art better understand the embodiments of the present invention, and are not intended to limit the scope of the embodiments of the present invention. Obviously, a person skilled in the art may perform various equivalent modifications or changes according to the provided examples in FIG. 3 and FIG. 4, and such modifications or changes also fall within the scope of the embodiments of the present invention.

It should be understood that, sequence numbers of the foregoing processes do not mean an executing sequence. An executing sequence of the processes should be determined according to functions and internal logic of the processes, and should not impose any limitation on the implementation processes of the embodiments of the present invention.

FIG. 5 shows a schematic flowchart of a method 300 for transmitting data on a WLAN according to still another embodiment of the present invention. The method may be executed by user equipment UE. As shown in FIG. 5, the method 300 includes:

S310: Send state information of the user equipment UE to an access point AP, where the state information of the UE includes at least one type of the following information: buffer status info nation of the UE and quality of service QoS information of the UE, so that the AP determines a data transmission policy of the UE according to the state information of the UE.

S320: Receive first indication information sent by the AP, where the first indication information is used to indicate the data transmission policy.

S330: Perform data transmission with the AP according to the data transmission policy.

In S310, the UE may directly send the state information of the UE to the AP. Optionally, the UE may send buffer status information, for example, a BRS, of the UE to a serving base station of the UE. A base station side may also acquire QoS of the UE in multiple manners, and send the buffer status information of the UE and/or the QoS to the AP. However, this embodiment of the present invention is not limited thereto.

In S320, the data transmission policy may include a manner for the UE to acquire a transmission resource and/or information about whether the UE has a high priority to send data to the AP when the UE needs to acquire a transmission resource through contention. Optionally, the data transmission policy may indicate that the UE sends data to the AP by using a specified transmission resource. In this case, the UE may directly send the data to the AP by using the resource without needing to contend for a transmission resource with another UE. In this case, the data transmission policy is mainly used for data scheduling. Optionally, as another embodiment, the data transmission policy may also indicate that the UE needs to acquire a transmission resource through contention, and indicate whether the UE has a high priority to send data when the UE obtains a transmission resource through contention. For a specific implementation manner, reference may be made to the foregoing descriptions about FIG. 1 and FIG. 2. However, this embodiment of the present invention is not limited thereto.

Therefore, according to the method for transmitting data on a WLAN in this embodiment of the present invention, UE reports state information of the UE to an AP, so that the AP may determine a data transmission policy of the UE according to the state information; in this way, a probability that collision and interference occur when UEs served by the AP send data can be reduced, thereby reducing a data transmission time delay, increasing data transmission efficiency, and improving user experience.

Figure 6:
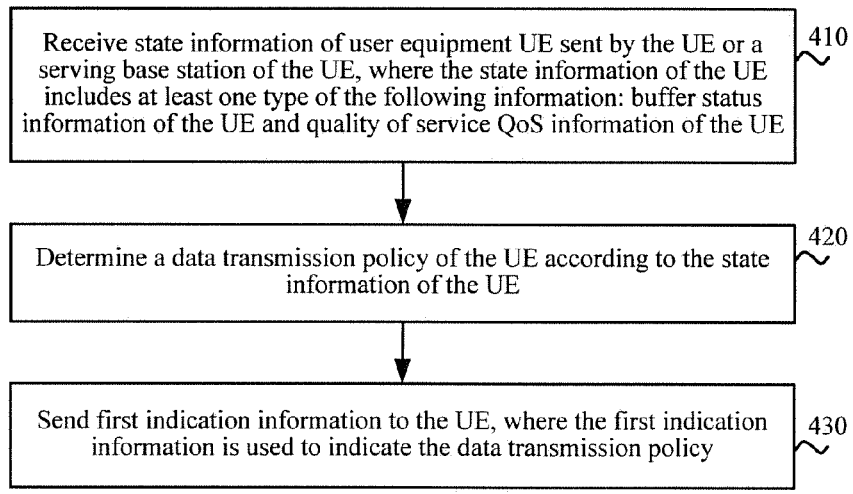
FIG. 6 is a schematic flowchart of a method for transmitting data on a WLAN according to still another embodiment of the present invention.

FIG. 6 shows a schematic flowchart of a method 400 for transmitting data on a WLAN according to still another embodiment of the present invention. The method may be executed by an access point AP. As shown in FIG. 6, the method 400 includes:

S410: Receive state information of user equipment UE sent by the UE or a serving base station of the UE, where the state information of the UE includes at least one type of the following information: buffer status information of the UE and quality of service QoS information of the UE.

S420: Determine a data transmission policy of the UE according to the state information of the UE.

S430: Send first indication information to the UE, where the first indication information is used to indicate the data transmission policy.

Therefore, according to the method for transmitting data on a WLAN in this embodiment of the present invention, UE reports state information of the UE to an AP, so that the AP may determine a data transmission policy of the UE according to the state information; in this way, a probability that collision and interference occur when UEs served by the AP send data can be reduced, thereby reducing a data transmission time delay, increasing data transmission efficiency, and improving user experience.

In the foregoing, the method for transmitting data on a WLAN according to the embodiments of the present invention is described in detail with reference to FIG. 1 to FIG. 6. In the following, an access point and user equipment according to embodiments of the present invention are described with reference to FIG. 7 to FIG. 14.

FIG. 7 shows a schematic block diagram of user equipment UE 500 according to an embodiment of the present invention. As shown in FIG. 7, the UE 500 includes:

a receiving module 510, configured to receive first indication information sent by an access point AP, where the first indication information is used to indicate that the UE can preferentially send data to the AP when the UE obtains a transmission resource through contention;

a determining module 520, configured to determine, according to the first indication information received by the receiving module 510, a first moment for sending current data to the AP, where an interval between a second moment at which the UE receives a first feedback message sent by the AP and the first moment is a first sending interval, the first feedback message is used to indicate whether the AP has successfully received a previous piece of data sent by the UE, and the first sending interval is less than a distributed interframe space DIFS; and a sending module 530, configured to send the current data to the AP at the first moment determined by the determining module 520.

Therefore, according to the user equipment in this embodiment of the present invention, the UE is configured, by using an AP, to preferentially send data to the AP when the UE obtains a transmission resource through contention, so that when the UE has sent a previous piece of data to the AP and needs to send current data, the UE does not need to contend for a resource again, and after receiving a feedback message that is sent by the AP and that is used to indicate whether the previous piece of data is successfully received, can send the current data to the AP within a time interval less than a DIFS, while another UE can begin contending for a resource only when detecting that a transmission channel is always idle within a time interval in the DIFS; in this way, collision between the UE and the another UE can be avoided, and a probability that collision and interference occur when UEs served by the AP send data to the AP can be reduced, thereby reducing a data transmission time delay, increasing data transmission efficiency, and improving user experience.

Optionally, the receiving module 510 is specifically configured to receive the first feedback message sent by the AP, where the first feedback message carries the first indication information, and the first indication information is specifically used to indicate that the UE can preferentially send the current data to the AP.

Optionally, as another embodiment, the first indication information received by the receiving module 510 is specifically used to indicate that the UE can preferentially send data of a total data amount less than a preset threshold to the AP when the UE obtains a transmission resource through contention; and accordingly, the determining module 520 is specifically configured to: when a total data amount of data sent to the AP by using a first transmission resource obtained through contention does not exceed the preset threshold, determine the first moment for sending the current data to the AP.

Optionally, as another embodiment, the receiving module 510 is specifically configured to receive a beacon frame sent by the AP, where the beacon frame carries the first indication information; or the receiving module 510 is specifically configured to receive an association response message that is sent by the AP when the AP receives an association request message sent by the UE, where the association response message carries the first indication information; or the receiving module 510 is specifically configured to receive a clear to send CTS message that is sent by the AP when the AP receives a request to send RTS message sent by the UE, where the CTS message carries the first indication information.

Optionally, as another embodiment, the sending module 530 is further configured to: before the receiving module 510 receives the first indication information sent by the AP, send state information of the UE to the AP, so that the AP determines the first indication information according to the state information of the UE, where the state information of the UE includes at least one type of the following information: buffer status information of the UE and quality of service QoS information of the UE.

The user equipment 500 according to this embodiment of the present invention may correspond to the user equipment according to the embodiments of the present invention, and the foregoing and other operations and/or functions of the modules in the user equipment 500 are separately used for implementing corresponding procedures of the methods in FIG. 1 to FIG. 4. For brevity, details are not described herein again.

Therefore, according to the user equipment UE in this embodiment of the present invention, the UE is configured, by using an AP, to preferentially send data to the AP when the UE obtains a transmission resource through contention, so that when the UE has sent a previous piece of data to the AP and needs to send current data, the UE does not need to contend for a resource again, and after receiving a feedback message that is sent by the AP and that is used to indicate whether the previous piece of data is successfully received, can send the current data to the AP within a time interval less than a DIFS, while another UE can begin contending for a resource only when detecting that a transmission channel is always idle within a time interval in the DIFS; in this way, collision between the UE and the another UE can be avoided, and a probability that collision and interference occur when UEs served by the AP send data to the AP can be reduced, thereby reducing a data transmission time delay, increasing data transmission efficiency, and improving user experience.

FIG. 8 shows a schematic block diagram of an access point AP 600 according to an embodiment of the present invention. As shown in FIG. 8, the AP 600 includes:
- a determining module 610, configured to determine first indication information, where the first indication information is used to indicate that user equipment UE can preferentially send data to the AP when the UE obtains a transmission resource through contention;
- a sending module 620, configured to send the first indication information determined by the determining module 610 to the UE, so that the UE determines, according to the first indication information, a first moment for sending current data, where an interval between a second moment at which the AP sends a first feedback message for indicating whether a previous piece of data is successfully received and the first moment is a first sending interval, and the first sending interval is less than a distributed interframe space DIFS; and
- a receiving module 630, configured to receive the current data that is sent by the UE at the first moment determined according to the first indication information sent by the sending module 620.

Therefore, according to the access point AP in this embodiment of the present invention, UE is configured, by using the AP, to preferentially send data to the AP when the UE obtains a transmission resource through contention, so that when the UE has sent a previous piece of data to the AP and needs to send current data, the UE does not need to contend for a resource again, and after receiving a feedback message that is sent by the AP and that is used to indicate whether the previous piece of data is successfully received, can send the current data to the AP within a time interval less than a DIFS, while another UE can begin contending for a resource only when detecting that a transmission channel is always idle within a time interval in the DIFS; in this way, collision between the UE and the another UE can be avoided, and a probability that collision and interference occur when UEs served by the AP send data to the AP can be reduced, thereby reducing a data transmission time delay, increasing data transmission efficiency, and improving user experience.

Optionally, the receiving module 630 is further configured to: before the determining module 610 determines the first indication information, receive state information of the UE sent by the UE or a serving base station of the UE, where the state information of the UE includes at least one type of the following information: buffer status information of the UE and quality of service QoS information of the UE; and
- accordingly, the determining module 610 is specifically configured to determine the first indication information according to the state information of the UE received by the receiving module 630.

Optionally, as another embodiment, the sending module 620 is specifically configured to send the first indication information carried in the first feedback message, where the first indication information is used to indicate that the UE can preferentially send the current data to the AP.

Optionally, as another embodiment, the first indication information determined by the determining module 610 is specifically used to indicate that the UE can preferentially send data of a total data amount less than a preset threshold to the AP when the UE obtains a transmission resource through contention; and
- accordingly, the receiving module 630 is specifically configured to receive the current data that is sent by the UE at the first moment when a total data amount of data sent by using a first transmission resource obtained through contention does not exceed the preset threshold.

Optionally, as another embodiment, the sending module 620 is specifically configured to send a beacon frame to the UE, where the beacon frame carries the first indication information; or
- the sending module 620 is specifically configured to: when an association request message sent by the UE is received, send an association response message to the UE, where the association response message carries the first indication information; or
- the sending module 620 is specifically configured to: when a request to send RTS message sent by the UE is received, send a clear to send CTS message to the UE, where the CTS message carries the first indication information.

The access point 600 according to this embodiment of the present invention may correspond to the access point AP in a method according to the embodiments of the present invention, and the foregoing and other operations and/or functions of the modules in the access point 600 are separately used for implementing corresponding procedures of the methods in FIG. 2 to FIG. 4. For brevity, details are not described herein again.

Therefore, according to the access point AP in this embodiment of the present invention, UE is configured, by using the AP, to preferentially send data to the AP when the UE obtains a transmission resource through contention, so that when the UE has sent a previous piece of data to the AP and needs to send current data, the UE does not need to contend for a resource again, and after receiving a feedback message that is sent by the AP and that is used to indicate whether the previous piece of data is successfully received, can send the current data to the AP within a time interval less than a DIFS, while another UE can begin contending for a resource only when detecting that a transmission channel is always idle within a time interval in the DIFS; in this way, collision between the UE and the another UE can be avoided, and a probability that collision and interference occur when UEs served by the AP send data to the AP can be reduced, thereby reducing a data transmission time delay, increasing data transmission efficiency, and improving user experience.

FIG. 9 shows a schematic block diagram of user equipment UE 700 according to another embodiment of the present invention. As shown in FIG. 9, the UE 700 includes:

a sending module 710, configured to send state information of the UE to an access point AP, where the state information of the UE includes at least one type of the following information: buffer status information of the UE and quality of service QoS information of the UE, so that the AP determines a data transmission policy of the UE according to the state information of the UE;

a receiving module 720, configured to receive first indication information sent by the AP, where the first indication information is used to indicate the data transmission policy that is determined by the AP according to the state information sent by the sending module 710; and a transmission module 730, configured to perform data transmission with the AP according to the data transmission policy received by the receiving module 720.

The user equipment 700 according to this embodiment of the present invention may correspond to the user equipment in a method according to the embodiments of the present invention, and the foregoing and other operations and/or functions of the modules in the user equipment 700 are separately used for implementing corresponding procedures of the method in FIG. 5. For brevity, details are not described herein again.

Therefore, according to the user equipment UE in this embodiment of the present invention, the UE reports state information of the UE to an AP, so that the AP may determine a data transmission policy of the UE according to the state information; in this way, a probability that collision and interference occur when UEs served by the AP send data can be reduced, thereby reducing a data transmission time delay, increasing data transmission efficiency, and improving user experience.

FIG. 10 shows a schematic block diagram of an access point AP 800 according to another embodiment of the present invention. As shown in FIG. 10, the AP 800 includes:

a receiving module 810, configured to receive state information of user equipment UE sent by the UE or a serving base station of the UE, where the state information of the UE includes at least one type of the following information: buffer status information of the UE and quality of service QoS information of the UE;

a determining module 820, configured to determine a data transmission policy of the UE according to the state information of the UE received by the receiving module 810; and a sending module 830, configured to send first indication information to the UE, where the first indication information is used to indicate the data transmission policy determined by the determining module 820.

The access point 800 according to this embodiment of the present invention may correspond to the access point AP in a method according to the embodiments of the present invention, and the foregoing and other operations and/or functions of the modules in the access point 800 are separately used for implementing corresponding procedures of the method in FIG. 6. For brevity, details are not described herein again.

Therefore, according to the access point AP in this embodiment of the present invention, UE reports state information of the UE to the AP, so that the AP may determine a data transmission policy of the UE according to the state information; in this way, a probability that collision and interference occur when UEs served by the AP send data can be reduced, thereby reducing a data transmission time delay, increasing data transmission efficiency, and improving user experience.

FIG. 11 shows a schematic block diagram of user equipment UE 900 according to an embodiment of the present invention. As shown in FIG. 11, the UE 900 includes a processor 910, a memory 920, a bus system 930, a receiver 940, and a transmitter 950. The processor 910, the memory 920, the receiver 940, and the transmitter 950 are connected to each other by using the bus system 930, the memory 920 is configured to store an instruction, and the processor 910 invokes, by using the bus system 930, the instruction stored in the memory 920. Specifically, the receiver 940 is configured to receive first indication information sent by an access point AP, where the first indication information is used to indicate that the UE can preferentially send data to the AP when the UE obtains a transmission resource through contention; the processor 910 is configured to determine, according to the first indication information received by the receiver 940, a first moment for sending current data to the AP, where an interval between a second moment at which the UE receives a first feedback message sent by the AP and the first moment is a first sending interval, the first feedback message is used to indicate whether the AP has successfully received a previous piece of data sent by the UE, and the first sending interval is less than a distributed interframe space DIFS; and the transmitter 950 is configured to send the current data to the AP at the first moment determined by the processor 910.

Therefore, according to the user equipment in this embodiment of the present invention, the UE is configured, by using an AP, to preferentially send data to the AP when the UE obtains a transmission resource through contention, so that when the UE has sent a previous piece of data to the AP and needs to send current data, the UE does not need to contend for a resource again, and after receiving a feedback message that is sent by the AP and that is used to indicate whether the previous piece of data is successfully received, can send the current data to the AP within a time interval less than a DIFS, while another UE can begin contending for a resource only when detecting that a transmission channel is always idle within a time interval in the DIFS; in this way, collision between the UE and the another UE can be avoided, and a probability that collision and interference occur when UEs served by the AP send data to the AP can be reduced, thereby reducing a data transmission time delay, increasing data transmission efficiency, and improving user experience.

It should be understood that, in this embodiment of the present invention, the processor 910 may be a central processing unit (Central Processing Unit, CPU for short), or the processor 1100 may be another general processor, a digital signal processor (DSP), an application-specific integrated circuit (ASIC), a field-programmable gate array (FPGA) or another programmable logic device, an independent gate or a transistor logic device, an independent hardware component, or the like. The general processor may be a microprocessor, or the processor may be any common processor or the like.

The memory 920 may include a read-only memory and a random access memory, and provide an instruction and data to the processor 910. A part of the memory 920 may further include a nonvolatile random access memory. For example, the memory 920 may further store information about a device type.

The bus system 930, besides including a data bus, may further include a power bus, a control bus, a status signal bus, and the like. However, for a purpose of clear explanation, all buses are marked as the bus system 930 in the figure.

In a process of implementation, each step of the method may be completed through an integrated logic circuit of hardware in the processor 910 or an instruction in a software form. The steps with reference to the method disclosed in the embodiments of the present invention may be directly embodied as being executed and completed by a hardware processor or executed and completed by a combination of hardware and software modules in the processor. The software module may be located in a mature storage medium in the art, such as a random access memory, a flash memory, a read-only memory, a programmable read-only memory, an electronically erasable programmable memory, and a register. The storage medium is located in the memory 920, and the processor 910 reads information in the memory 92, and completes the steps of the method in combination with the hardware thereof. To avoid repetition, details are not described herein again.

Optionally, the receiver 940 is specifically configured to receive the first feedback message sent by the AP, where the first feedback message carries the first indication information, and the first indication information is specifically used to indicate that the UE can preferentially send the current data to the AP.

Optionally, as another embodiment, the first indication information received by the receiver 940 is specifically used to indicate that the UE can preferentially send data of a total data amount less than a preset threshold to the AP when the UE obtains a transmission resource through contention; and accordingly, the processor 910 is specifically configured to: when a total data amount of data sent to the AP by using a first transmission resource obtained through contention does not exceed the preset threshold, determine the first moment for sending the current data to the AP.

Optionally, as another embodiment, the receiver 940 is specifically configured to receive a beacon frame sent by the AP, where the beacon frame carries the first indication information; or the receiver 940 is specifically configured to receive an association response message that is sent by the AP when the AP receives an association request message sent by the UE, where the association response message carries the first indication information; or the receiver 940 is specifically configured to receive a clear to send CTS message that is sent by the AP when the AP receives a request to send RTS message sent by the UE, where the CTS message carries the first indication information.

Optionally, as another embodiment, the transmitter 950 is further configured to: before the receiver 940 receives the first indication information sent by the AP, send state information of the UE to the AP, so that the AP determines the first indication information according to the state information of the UE, where the state information of the UE includes at least one type of the following information: buffer status information of the UE and quality of service QoS information of the UE.

The user equipment 900 according to this embodiment of the present invention may correspond to the user equipment in a method according to the embodiments of the present invention, and the foregoing and other operations and/or functions of the modules in the user equipment 900 are separately used for implementing corresponding procedures of the methods in FIG. 1 to FIG. 4. For brevity, details are not described herein again.

Therefore, according to the user equipment UE in this embodiment of the present invention, the UE is configured, by using an AP, to preferentially send data to the AP when the UE obtains a transmission resource through contention, so that when the UE has sent a previous piece of data to the AP and needs to send current data, the UE does not need to contend for a resource again, and after receiving a feedback message that is sent by the AP and that is used to indicate whether the previous piece of data is successfully received, can send the current data to the AP within a time interval less than a DIFS, while another UE can begin contending for a resource only when detecting that a transmission channel is always idle within a time interval in the DIFS; in this way, collision between the UE and the another UE can be avoided, and a probability that collision and interference occur when UEs served by the AP send data to the AP can be reduced, thereby reducing a data transmission time delay, increasing data transmission efficiency, and improving user experience.

Figure 12:
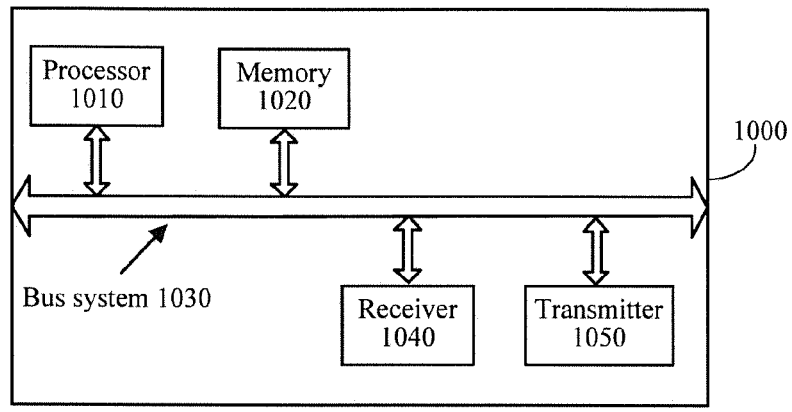
FIG. 12 is a schematic block diagram of an access point AP according to still another embodiment of the present invention.

FIG. 12 shows a schematic block diagram of an access point AP 1000 according to an embodiment of the present invention. As shown in FIG. 12, the AP 1000 includes a processor 1010, a memory 1020, a bus system 1030, a receiver 1040, and a transmitter 1050. The processor 1010, the memory 1020, the receiver 1040, and the transmitter 1050 are connected to each other by using the bus system 1030, the memory 1020 is configured to store an instruction, and the processor 1010 invokes, by using the bus system 1030, the instruction stored in the memory 1020. Specifically, the processor 1010 is configured to determine first indication information, where the first indication information is used to indicate that user equipment UE can preferentially send data to an AP when the UE obtains a transmission resource through contention; the transmitter 1050 is configured to send the first indication information determined by the processor 1010 to the UE, so that the UE determines, according to the first indication information, a first moment for sending current data, where an interval between a second moment at which the AP sends a first feedback message for indicating whether a previous piece of data is successfully received and the first moment is a first sending interval, and the first sending interval is less than a distributed interframe space DIFS; and the receiver 1040 is configured to receive the current data that is sent by the UE at the first moment determined according to the first indication information sent by the transmitter 1050.

Therefore, according to the access point AP in this embodiment of the present invention, UE is configured, by using the AP, to preferentially send data to the AP when the UE obtains a transmission resource through contention, so that when the UE has sent a previous piece of data to the AP and needs to send current data, the UE does not need to contend for a resource again, and after receiving a feedback message that is sent by the AP and that is used to indicate whether the previous piece of data is successfully received, can send the current data to the AP within a time interval less than a DIFS, while another UE can begin contending for a resource only when detecting that a transmission channel is always idle within a time interval in the DIFS; in this way, collision between the UE and the another UE can be avoided, and a probability that collision and interference occur when UEs served by the AP send data to the AP can be reduced, thereby reducing a data transmission time delay, increasing data transmission efficiency, and improving user experience.

It should be understood that, in this embodiment of the present invention, the processor 1010 may be a central processing unit (Central Processing Unit, CPU for short), or the processor 1010 may be another general processor, a digital signal processor (DSP), an application-specific integrated circuit (ASIC), a field-programmable gate array (FPGA) or another programmable logic device, an independent gate or a transistor logic device, an independent hardware component, or the like. The general processor may be a microprocessor, or the processor may be any common processor or the like.

The memory 1020 may include a read-only memory and a random access memory, and provide an instruction and data to the processor 1010. A part of the memory 1020 may further include a nonvolatile random access memory. For example, the memory 1020 may further store information about a device type.

The bus system 1030, besides including a data bus, may further include a power bus, a control bus, a status signal bus, and the like. However, for a purpose of clear explanation, all buses are marked as the bus system 1030 in the figure.

In a process of implementation, each step of the method may be completed through an integrated logic circuit of hardware in the processor 1010 or an instruction in a software form. The steps with reference to the method disclosed in the embodiments of the present invention may be directly embodied as being executed and completed by a hardware processor or executed and completed by a combination of hardware and software modules in the processor. The software module may be located in a mature storage medium in the art, such as a random access memory, a flash memory, a read-only memory, a programmable read-only memory, an electronically erasable programmable memory, and a register. The storage medium is located in the memory 1020, and the processor 1010 reads information in the memory 1020 and completes the steps of the method in combination with the hardware thereof. To avoid repetition, details are not described herein again.

Optionally, the receiver 1040 is further configured to: before the processor 1010 determines the first indication information, receive state information of the UE sent by the UE or a serving base station of the UE, where the state information of the UE includes at least one type of the following information: buffer status information of the UE and quality of service QoS information of the UE; and accordingly, the processor 1010 is specifically configured to determine the first indication information according to the state information of the UE received by the receiver 1040.

Optionally, as another embodiment, the transmitter 1050 is specifically configured to send the first indication information carried in the first feedback message, where the first indication information is used to indicate that the UE can preferentially send the current data to the AP.

Optionally, as another embodiment, the first indication information determined by the processor 1010 is specifically used to indicate that the UE can preferentially send data of a total data amount less than a preset threshold to the AP when the UE obtains a transmission resource through contention; and accordingly, the receiver 1040 is specifically configured to receive the current data that is sent by the UE at the first moment when a total data amount of data sent by using a first transmission resource obtained through contention does not exceed the preset threshold.

Optionally, as another embodiment, the transmitter 1050 is specifically configured to send a beacon frame to the UE, where the beacon frame carries the first indication information; or the transmitter 1050 is specifically configured to: when an association request message sent by the UE is received, send an association response message to the UE, where the association response message carries the first indication information; or the transmitter 1050 is specifically configured to: when a request to send RTS message sent by the UE is received, send a clear to send CTS message to the UE, where the CTS message carries the first indication information.

The access point 1000 according to this embodiment of the present invention may correspond to the access point AP in a method according to the embodiments of the present invention, and the foregoing and other operations and/or functions of the modules in the access point 1000 are separately used for implementing corresponding procedures of the methods in FIG. 2 to FIG. 4. For brevity, details are not described herein again.

Therefore, according to the access point AP in this embodiment of the present invention, UE is configured, by using the AP, to preferentially send data to the AP when the UE obtains a transmission resource through contention, so that when the UE has sent a previous piece of data to the AP and needs to send current data, the UE does not need to contend for a resource again, and after receiving a feedback message that is sent by the AP and that is used to indicate whether the previous piece of data is successfully received, can send the current data to the AP within a time interval less than a DIFS, while another UE can begin contending for a resource only when detecting that a transmission channel is always idle within a time interval in the DIFS; in this way, collision between the UE and the another UE can be avoided, and a probability that collision and interference occur when UEs served by the AP send data to the AP can be reduced, thereby reducing a data transmission time delay, increasing data transmission efficiency, and improving user experience.

Figure 13:
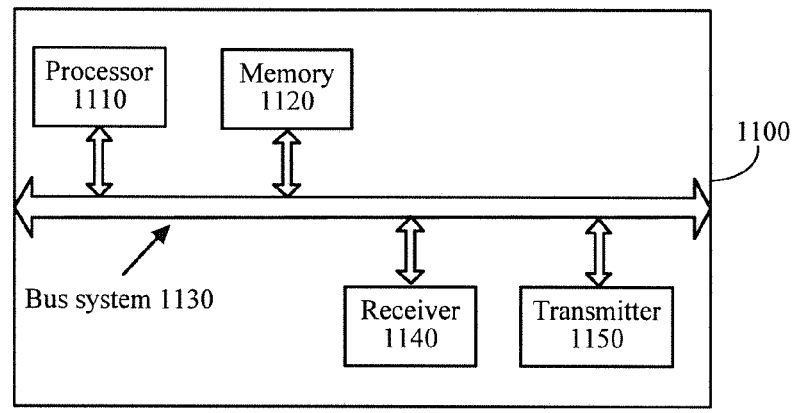
FIG. 13 is a schematic block diagram of user equipment UE according to still another embodiment of the present invention.

FIG. 13 shows a schematic block diagram of user equipment UE 1100 according to another embodiment of the present invention. As shown in FIG. 13, the UE 1100 includes a processor 1110, a memory 1120, a bus system 1130, a receiver 1140, and a transmitter 1150. The processor 1110, the memory 1120, the receiver 1140, and the transmitter 1150 are connected to each other by using the bus system 1130, the memory 1120 is configured to store an instruction, and the processor 1110 invokes, by using the bus system 1130, the instruction stored in the memory 1120. Specifically, the transmitter 1150 is configured to send state information of the UE to an access point AP, where the state information of the UE includes at least one type of the following information: buffer status information of the UE and quality of service QoS information of the UE, so that the AP determines a data transmission policy of the UE according to the state information of the UE; the receiver 1140 is configured to receive first indication information sent by the AP, where the first indication information is used to indicate the data transmission policy that is determined by the AP according to the state information sent by the transmitter 1150; and the processor 1110 is configured to perform data transmission with the AP according to the data transmission policy received by the receiver 1140.

It should be understood that, in this embodiment of the present invention, the processor 1110 may be a central processing unit (Central Processing Unit, CPU for short), or the processor 1110 may be another general processor, a digital signal processor (DSP), an application-specific integrated circuit (ASIC), a field-programmable gate array (FPGA) or another programmable logic device, an independent gate or a transistor logic device, an independent hardware component, or the like. The general processor may be a microprocessor, or the processor may be any common processor or the like.

The memory 1120 may include a read-only memory and a random access memory, and provide an instruction and data to the processor 1110. A part of the memory 1120 may further include a nonvolatile random access memory. For example, the memory 1120 may further store information about a device type.

The bus system 1130, besides including a data bus, may further include a power bus, a control bus, a status signal bus, and the like. However, for a purpose of clear explanation, all buses are marked as the bus system 1130 in the figure.

In a process of implementation, each step of the method may be completed through an integrated logic circuit of hardware in the processor 1110 or an instruction in a software form. The step with reference to the method disclosed in the embodiments of the present invention may be directly embodied as being executed and completed by a hardware processor or executed and completed by a combination of hardware and software modules in the processor. The software module may be located in a mature storage medium in the art, such as a random access memory, a flash memory, a read-only memory, a programmable read-only memory, an electronically erasable programmable memory, and a register. The storage medium is located in the memory 1120, and the processor 1110 reads information in the memory 1120 and completes the steps of the method in combination with the hardware thereof. To avoid repetition, details are not described herein again.

The user equipment 1100 according to this embodiment of the present invention may correspond to the user equipment in a method according to the embodiments of the present invention, and the foregoing and other operations and/or functions of the modules in the user equipment 1100 are separately used for implementing corresponding procedures of the method in FIG. 5. For brevity, details are not described herein again.

Therefore, according to the user equipment UE in this embodiment of the present invention, the UE reports state information of the UE to an AP, so that the AP may determine a data transmission policy of the UE according to the state information; in this way, a probability that collision and interference occur when UEs served by the AP send data can be reduced, thereby reducing a data transmission time delay, increasing data transmission efficiency, and improving user experience.

Figure 14:
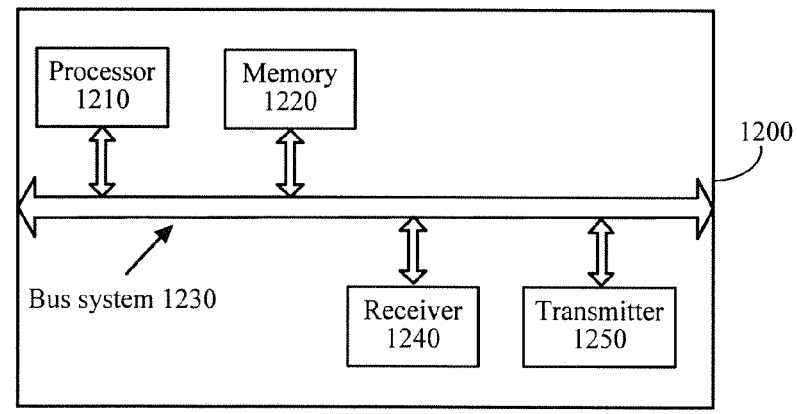
FIG. 14 is a schematic block diagram of an access point AP according to still another embodiment of the present invention.

FIG. 14 shows a schematic block diagram of an access point AP 1200 according to another embodiment of the present invention. As shown in FIG. 14, the AP 1200 includes:

a receiving module 810, configured to receive state information of user equipment UE sent by the UE or a serving base station of the UE, where the state information of the UE includes at least one type of the following information: buffer status information of the UE and quality of service QoS information of the UE;

a determining module 820, configured to determine a data transmission policy of the UE according to the state information of the UE received by the receiving module 810; and a sending module 830, configured to send first indication information to the UE, where the first indication information is used to indicate the data transmission policy determined by the determining module 820.

It should be understood that, in this embodiment of the present invention, the processor 1210 may be a central processing unit (Central Processing Unit, CPU for short), or the processor 1210 may be another general processor, a digital signal processor (DSP), an application-specific integrated circuit (ASIC), a field-programmable gate array (FPGA) or another programmable logic device, an independent gate or a transistor logic device, an independent hardware component, or the like. The general processor may be a microprocessor, or the processor may be any common processor or the like.

The memory 1220 may include a read-only memory and a random access memory, and provide an instruction and data to the processor 1210. A part of the memory 1220 may further include a nonvolatile random access memory. For example, the memory 1020 may further store information about a device type.

The bus system 1230, besides including a data bus, may further include a power bus, a control bus, a status signal bus, and the like. However, for a purpose of clear explanation, all buses are marked as the bus system 1230 in the figure.

In a process of implementation, each step of the method may be completed through an integrated logic circuit of hardware in the processor 1210 or an instruction in a software form. The step with reference to the method disclosed in the embodiments of the present invention may be directly embodied as being executed and completed by a hardware processor or executed and completed by a combination of hardware and software modules in the processor. The software module may be located in a mature storage medium in the art, such as a random access memory, a flash memory, a read-only memory, a programmable read-only memory, an electronically erasable programmable memory, and a register. The storage medium is located in the memory 1220, and the processor 1210 reads information in the memory 1220 and completes the steps of the method in combination the hardware thereof. To avoid repetition, details are not described herein again.

The access point 1200 according to this embodiment of the present invention may correspond to the access point AP in a method according to the embodiments of the present invention, and the foregoing and other operations and/or functions of the modules in the access point 1200 are separately used for implementing corresponding procedures of the method in FIG. 6. For brevity, details are not described herein again.

Therefore, according to the access point AP according to this embodiment of the present invention, UE reports state information of the UE to the AP, so that the AP may determine a data transmission policy of the UE according to the state information; in this way, a probability that collision and interference occur when UEs served by the AP send data can be reduced, thereby reducing a data transmission time delay, increasing data transmission efficiency, and improving user experience.

It should be understood that, the term "and/or" in this embodiment of the present invention describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for transmitting data on a wireless local area network, the method comprising:
    receiving first indication information sent by an access point (AP) to indicate that user equipment (UE) can preferentially send data to the AP and to indicate that the UE can preferentially send data of a total data amount less than a preset threshold to the AP when the UE obtains a transmission resource through contention;
    determining, according to the first indication information, a first moment for sending current data to the AP, comprising:
        when a total data amount of data sent to the AP by using a first transmission resource obtained through contention does not exceed the preset threshold, determining the first moment for sending the current data to the AP;
    wherein an interval between a second moment at which the UE receives a first feedback message sent by the AP and the first moment is a first sending interval, the first feedback message indicates whether the AP has successfully received a previous piece of data sent by the UE, and the first sending interval is less than a distributed interframe space (DIFS); and
    sending the current data to the AP at the first moment.

2. The method according to claim 1, wherein receiving first indication information sent by an AP comprises:
    receiving the first feedback message sent by the AP, wherein the first feedback message carries the first indication information to indicate that the UE can preferentially send the current data to the AP.

3. The method according to claim 1, wherein receiving first indication information sent by an AP comprises:
    receiving a beacon frame sent by the AP, wherein the beacon frame carries the first indication information; or
    receiving an association response message that is sent by the AP when the AP receives an association request message sent by the UE, wherein the association response message carries the first indication information; or
    receiving a clear to send (CTS) message that is sent by the AP when the AP receives a request to send (RTS) message sent by the UE, wherein the CTS message carries the first indication information.

4. The method according to claim 1, wherein before receiving first indication information sent by an AP, the method further comprises:
    sending state information of the UE to the AP to enable the AP to determine the first indication information according to the state information of the UE, wherein the state information of the UE comprises at least one type of the following information: buffer status information of the UE and quality of service (QoS) information of the UE.

5. A method for transmitting data on a wireless local area network, the method comprising:
  determining first indication information to indicate that user equipment (UE) can preferentially send data to an access point (AP) and to indicate that the UE can preferentially send data of a total data amount less than a preset threshold to the AP when the UE obtains a transmission resource through contention;
  sending the first indication information to the UE to enable the UE to determine, according to the first indication information, a first moment for sending current data, wherein an interval between a second moment at which the AP sends a first feedback message for indicating whether a previous piece of data is successfully received and the first moment is a first sending interval, and the first sending interval is less than a distributed interframe space (DIFS); and
  receiving the current data that is sent at the first moment by the UE, comprising:
    receiving the current data sent by the UE at the first moment when a total data amount of data sent by using a first transmission resource obtained through contention does not exceed the preset threshold.

6. The method according to claim 5, wherein:
  before determining first indication information, the method further comprises:
    receiving state information of the UE sent by the UE or a serving base station of the UE, wherein the state information of the UE comprises at least one type of the following information: buffer status information of the UE and quality of service QoS information of the UE; and
  determining first indication information comprises:
    determining the first indication information according to the state information of the UE.

7. The method according to claim 5, wherein sending the first indication information to the UE comprises:
  sending the first indication information carried in the first feedback message to indicate that the UE can preferentially send the current data to the AP.

8. The method according to claim 5, wherein sending the first indication information to the UE comprises:
  sending a beacon frame to the UE, wherein the beacon frame carries the first indication information; or
  when receiving an association request message sent by the UE, sending an association response message to the UE, wherein the association response message carries the first indication information; or
  when receiving a request to send (RTS) message sent by the UE, sending a clear to send (CTS) message to the UE, wherein the CTS message carries the first indication information.

9. User equipment (UE), comprising:
  a processor;
  memory coupled to the processor, the memory comprising instructions that, when executed by the processor, cause the UE to:
    receive first indication information sent by an access point (AP) to indicate that the UE can preferentially send data to the AP and to indicate that the UE can preferentially send data of a total data amount less than a preset threshold to the AP when the UE obtains a transmission resource through contention;
    determine, according to the received first indication information, a first moment for sending current data to the AP by determining when a total data amount of data sent to the AP by using a first transmission resource obtained through contention does not exceed the preset threshold, wherein an interval between a second moment at which the UE receives a first feedback message sent by the AP and the first moment is a first sending interval, the first feedback message indicates whether the AP has successfully received a previous piece of data sent by the UE, and the first sending interval is less than a distributed interframe space (DIFS); and
    send the current data to the AP at the determined first moment.

10. The UE according to claim 9, wherein the memory further comprises instructions that, when executed by the processor, cause the UE to:
  receive the first feedback message sent by the AP, wherein the first feedback message carries the first indication information to indicate that the UE can preferentially send the current data to the AP.

11. The UE according to claim 9, wherein the memory further comprises instructions that, when executed by the processor, cause the UE to:
  receive a beacon frame sent by the AP, wherein the beacon frame carries the first indication information; or
  receive an association response message that is sent by the AP when the AP receives an association request message sent by the UE, wherein the association response message carries the first indication information; or
  receive a clear to send (CTS) message that is sent by the AP when the AP receives a request to send (RTS) message sent by the UE, wherein the CTS message carries the first indication information.

12. The UE according to claim 9, wherein the memory further comprises instructions that, when executed by the processor, cause the UE to:
  before receiving the first indication information sent by the AP, send state information of the UE to the AP to enable the AP to determine the first indication information according to the state information of the UE, wherein the state information of the UE comprises at least one type of the following information: buffer status information of the UE and quality of service (QoS) information of the UE.

13. An access point (AP), comprising:
  a processor;
  memory coupled to the processor, the memory comprising instructions that, when executed by the processor, cause the AP to:
    determine first indication information to indicate that user equipment (UE) can preferentially send data to the AP and to indicate that the UE can preferentially send data of a total data amount less than a preset threshold to the AP when the UE obtains a transmission resource through contention;
    send the determined first indication information to the UE to enable the UE to determine, according to the first indication information, a first moment for sending current data, wherein an interval between a second moment at which the AP sends a first feedback message for indicating whether a previous piece of data is successfully received and the first moment is a first sending interval, and the first sending interval is less than a distributed interframe space (DIFS); and receive the current data that is sent by the UE at the first moment when a total data amount of data sent by using a first transmission resource obtained through contention does not exceed the preset threshold.

14. The AP according to claim 13, wherein the memory further comprises instructions that, when executed by the processor, cause the AP to:

before determining the first indication information, receive state information of the UE sent by the UE or a serving base station of the UE, wherein the state information of the UE comprises at least one type of the following information: buffer status information of the UE and quality of service (QoS) information of the UE; and determine the first indication information according to the received state information of the UE.

15. The AP according to claim 13, wherein the memory further comprises instructions that, when executed by the processor, cause the AP to:

send the first indication information carried in the first feedback message to indicate that the UE can preferentially send the current data to the AP.

16. The AP according to claim 13, wherein the memory further comprises instructions that, when executed by the processor, cause the AP to:

send a beacon frame to the UE, wherein the beacon frame carries the first indication information; or when an association request message sent by the UE is received, send an association response message to the UE, wherein the association response message carries the first indication information; or when a request to send (RTS) message sent by the UE is received, send a clear to send (CTS) message to the UE, wherein the CTS message carries the first indication information.

* * * * *